April 1, 1969  P. HENSLER  3,435,612
DRIVE UNIT FOR VEHICLES, ESPECIALLY MOTOR VEHICLES
Filed Nov. 29, 1966
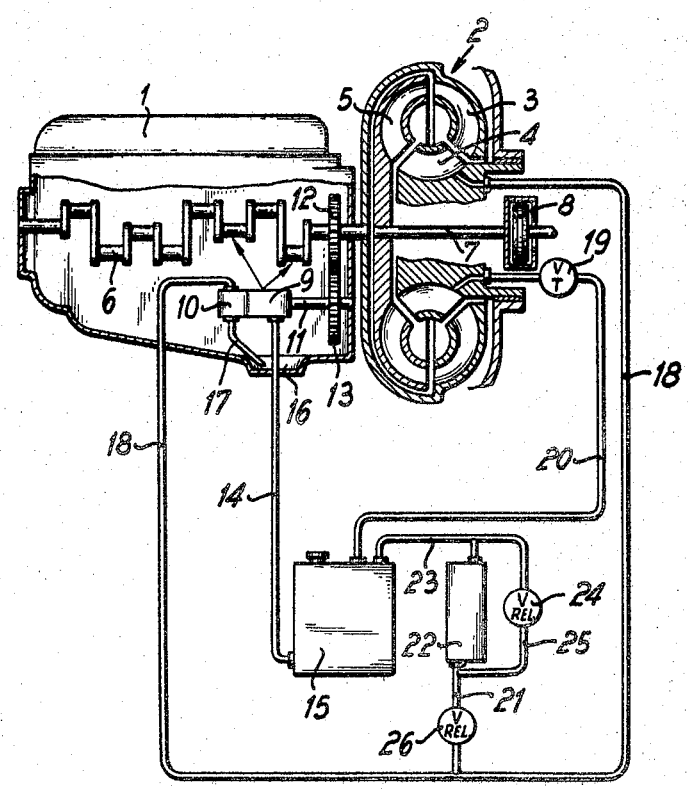
INVENTOR:
Paul HENSLER
BY Dicker & Craig
ATTORNEYS

# United States Patent Office 3,435,612
Patented Apr. 1, 1969

3,435,612
DRIVE UNIT FOR VEHICLES, ESPECIALLY MOTOR VEHICLES
Paul Hensler, Munchingen, Kreis Leonberg, Germany, assignor to Firma Dr. Ing. h.c.f. Porsche KG, Stuttgart-Zuffenhausen, Germany
Filed Nov. 29, 1966, Ser. No. 597,579
Claims priority, application Germany, Dec. 16, 1965, P 38,352
Int. Cl. F16h 41/30
U.S. Cl. 60—12     12 Claims

ABSTRACT OF THE DISCLOSURE

An internal combustion engine oil circulation system wherein only two pumps are provided for lubricating the internal combustion engine and supplying filling fluid for a hydrodynamic torque converter. One pump returns oil that has dropped into the engine pan from the bearings to a reservoir tank through a pressure regulator and simultaneously provides the filling oil for the torque converter. The torque converter drains through a throttle valve into the tank and a second pump supplys oil from the tank to the engine bearings. The pressure regulator may be a perssure valve and/or an oil filter and excess pressure valve in parallel.

---

It is already known in the prior art to utilize the lubricant of an internal combustion engine simultaneously as working liquid for a hydrodynamic torque converter cooperating with the internal combustion engine. The lubricant is thereby supplied by a gear-ring pump which is driven from the crankshaft of the internal combustion engine. The gear-ring pump sucks in the lubricant out of the oil sump of the internal combustion engine and presses the same into the torque converter space from where the lubricant is conducted back again into the oil sump by way of a return line. Such an installation comprises, notwithstanding the common utilization of the lubricant of the internal combustion engine also as working liquid of the torque converter, two circulatory systems completely separate from each other for the lubrication of the internal combustion engine, on the one hand, and the feed of the torque converter, on the other. As a result of this separation, individual supply and control devices as well as lines or conduits are necessary for each of the individual circulatory systems whereby the manufacturing costs as well as the structural size and susceptibility to troubles on the part of the installation is increased. Additionally, the efficiency of the installation is reduced by each of the auxiliary aggregates, such as feed pump or the like, to be driven by the internal combustion engine which is of disadvantage in particular with small aggregates or units.

In contradistinction thereto, the aim of the present invention essentially consists of simplifying the circulatory system of the torque converter by the use of already present aggregates or units necessary anyhow for the operation of the internal combustion engine.

This is achieved according to the present invention in that one of the lubricant pumps, especially a return pump of the internal combustion engine simultaneously serves as filling pump for the hydrodynamic torque converter. A supply installation serving exclusively for the operation of the torque converter can be economized by this measure and the pressure medium circulatory system thereof can be simplified which is of advantage as regards manufacturing costs as well as the structural dimensions and likelihood of break-downs and failures of the installation. Additionally, by the elimination of a separate torque converter filling pump, the efficiency of the installation is increased which is especially of advantage with small units. The pump supplying lubricant to the torque converter is preferably connected directly with the lubricant tank or working fluid reservoir by way of a by-pass line, by-passing the torque converter and including a pressure-regulating installation. As a result thereof, after a rapid pressure build-up a constant working pressure is assured in the torque converter and the same is protected simultaneously and safely from any possible overloads. It is also possible that with a corresponding dimensioning of the installation the pressure-regulating installation inserted into the by-pass line is constituted by the lubricant filter of the internal combustion engine. As a result thereof, a separate pressure-regulating valve for the circulatory system of the torque converter is obviated thereby whence the installation is further simplified.

Accordingly, it is an object of the present invention to provide a drive unit for vehicles, especially motor vehicles consisting of an internal combustion engine and of a torque converter connected to the output of the engine, which eliminates by simple and extremely effective means the aforementioned shortcomings and drawbacks encountered with the prior art constructions.

It is another object of the present invention to provide a drive unit consisting of internal combustion engine and torque converter which obviates the need for completely separate circulatory systems for the lubrication of the internal combustion engine and the supply of working liquid to the torque converter.

A further object of the present invention resides in a drive unit including an internal combustion engine and torque converter which is characterized by greater simplicity, fewer supply and control installations as well as a reduction of fluid lines for conducting the lubricant or working medium.

Another object of the present invention resides in a drive unit comprising an internal combustion engine and hydrodynamic torque converter utilizing a common hydraulic circulatory system, which offers the advantage of reduced manufacturing costs, smaller dimensions, and greater freedom from break-downs and operational disturbances.

Still another object of the present invention resides in a drive unit of the type described above which excels by an increased efficiency.

These and further objects, features, and advantages of the present invention will become more obvious from the following description when taken in connection with the accompanying drawing which shows, for purposes of illustration only, one embodiment in accordance with the present invention, and wherein:

The single figure is a schematic view of an internal combustion engine and of a torque converter provided with a lubricant and working liquid supply system according to the present invention.

Referring now to the single figure of the drawing, the drive unit comprises a conventional internal combustion engine 1 and a hydrodynamic torque converter generally designated by reference numeral 2. The torque converter 2 consists, as usual, of a pump wheel 3, of a guide wheel 4, as well as of a turbine wheel 5. The pump wheel 3 is operatively connected in a conventional manner with the crankshaft 6 of the internal combustion engine 1. The turbine wheel 5 is operatively connected by way of a shaft 7 under interposition of a separating clutch 8 with any suitable change-speed gear transmission not illustrated in the drawing.

For the supply of the lubricating system of the internal combustion engine operating according to the dry-sump principle, two pumps 9 and 10 are provided which are constructed as gear pumps. The pumps 9 and 10 are arranged on a common shaft 11 and are driven by way of gear wheels 12 and 13 from the crankshaft 6 of the internal combustion engine 1. The pump 9 sucks the lubricant by way of a line 14 out of the supply or reservoir tank 15 and forces the same to the individual bearing places of the internal combustion engine 1, indicated by the arrows. The lubricant flows from the bearing places into an oil pan 16. The lubricant is sucked out of this oil pan 16 by means of a pump 10 by way of a line 17 and is conducted by way of a line 18 as pressure medium to the hydrodynamic torque converter 2. The lubricant or pressure medium flows back out into the tank 15 of the torque converter 2 against the effect of a throttle valve 19 by way of a return line 20.

A line 21 branches off from the line 18 between the pump 10 and the torque converter 2. The line 21 terminates in an oil filter 22 serving simultaneously as pressure-regulating installation for the pressure medium circulatory system of the torque converter 2. The lubricant or pressure medium reaches the tank 15 from the oil filter 22 by way of a line 23. In order to maintain the circulation in case of a clogging of the oil filter 22, a by-pass line 25 is provided which by-passes the oil filter 22 and is provided with an excess pressure valve 24.

If for structural or technical reasons a design of the oil filter 22 as pressure-regulating installation for the pressure-medium circulatory system of the torque converter 2 is not possible, then a conventional pressure-regulating valve 26 is to be arranged in the line 21.

The pressure-regulating installation represented by the oil filter 22 or the valve 26 assures during the starting of the installation a rapid filling of the torque converter 2 since the by-pass line constituted by the lines 21 and 23 is closed until the attainment of the torque converter working pressure of about 2 to 2.5 atmospheres excess pressure. If the necessary working pressure of the torque converter 2 is attained, then the pressure-regulating installation opens the by-pass line and the excess lubricating or pressure medium, not necessary for the operation of the torque converter, is supplied by the pump 10 directly into the reservoir tank 15.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A drive unit for vehicles, especially motor vehicles, comprising internal combustion engine means including bearing places, a pan recovering lubricating oil from the bearing places, a lubricant reservoir tank separate from said pan, hydrodynamic torque converter means operatively connected to said engine means, and means to enable use of the lubricant of said internal combustion engine means as working liquid for the torque converter means, said last-mentioned means including one of the lubricant pump means of the engine means serving simultaneously as filling pump means for the hydrodynamic torque converter means.

2. A drive unit according to claim 1, wherein the lubricant pump means serving as filling pump means is a return pump returning lubricant from said pan to said tank.

3. A drive unit according to claim 1, further comprising by-pass line means effectively by-passing said torque converter means and operatively connecting the pressure side of the filling pump with said tank means, said by-pass line means including pressure-regulating means.

4. A drive unit according to claim 3, wherein said pressure-regulating means is constituted by a lubricant filter of the internal combustion engine.

5. A drive unit according to claim 3, wherein said pressure-regulating means is constituted by an excess pressure valve.

6. A drive unit according to claim 1, one of said pump means supplying the lubricant from said tank to bearing places in the internal combustion engine means, a second one of said pump means supplying the oil from said pan by way of a feed line to said torque converter means, a return line connecting the outlet of said torque converter means with said tank, and by-pass line means by-passing said torque converter means and operable only upon reaching a predetermined pressure in the working space of said torque converter means.

7. A drive unit according to claim 6, wherein the return line is provided with throttle valve means and wherein the by-pass line means is provided with pressure-regulating means.

8. A drive unit according to claim 7, wherein said pressure-regulating means is constituted by an oil filter of the internal combustion engine.

9. A drive unit according to claim 8, further comprising a by-pass line provided with an excess pressure valve by-passing said oil filter.

10. A drive unit according to claim 7, wherein said pressure-regulating means is constituted by an excess pressure valve.

11. A drive unit according to claim 1, wherein there are only two pump means in the lubricant circuit and the torque converter means liquid circuit.

12. A drive unit according to claim 1, wherein said one lubricant pump means pumps liquid from said pan to said torque converter for supplying all of the liquid filling said torque converter; line means draining said torque converter into said tank; the other of said pump means pumping liquid from said tank to said bearing parts.

References Cited

UNITED STATES PATENTS

| 2,072,180 | 3/1937 | Paton. |
| 2,186,748 | 1/1940 | Berger _____ 60—54 |
| 2,871,981 | 2/1959 | Baits. |

EDGAR W. GEOGHEGAN, *Primary Examiner.*

U.S. Cl. X.R.

60—54; 123—196; 184—6